INVENTORS
FRANK G. LOMBARDI
FRITZ HOSTETTLER 3,605,848
MICROCELLULAR URETHANE ELASTOMERS OF
RELATIVELY LOW DENSITY
Frank G. Lombardi, Manchester, Conn., and Fritz
Hostettler, Verona, N.J., assignors to Inter-Polymer
Corporation, Passaic, N.J.
Filed Dec. 23, 1968, Ser. No. 785,929
Int. Cl. B60c 7/12; C08g 22/48; C08f 47/10
U.S. Cl. 152—310
6 Claims

ABSTRACT OF THE DISCLOSURE

A bullet proof vehicle tire having a peripheral coating of solid polyurethane elastomers and a core of predominantly open-celled microcellular polyurethane elastomers having a density of from about 6 to about 25 pounds per cubic foot produced by the reaction of (a) a polyol containing at least about 35% of secondary hydroxyl end-groups, (b) an organic polyisocyanate, (c) a surfactant, (d) a foaming agent, and (e) a catalyst.

BACKGROUND OF THE INVENTION

This invention relates to the manufacture of predominantly open-celled microcellular elastomers having a density of from about 6 lbs./cu. ft. to about 25 lbs./cu. ft. The result is accomplished by reacting (a) substantially linear polytetramethyleneoxy glycols which are end-blocked by means of secondary hydroxyl groups to the extent of at least about 35% or by reacting polyesters from dicarboxylic acids, hydroxycarboxylic acids or lactones and glycols, said polyesters being end-blocked by means of secondary hydroxyl groups to the extent of at least 35%, (b) organic polyisocyanates, and (c) water and/or additional chain-extender or blowing agents other than water, in the presence of catalysts capable of accelerating the isocyanate reaction and surface-active agents capable of stabilizing the foaming mixture.

DESCRIPTION OF THE PRIOR ART

It is well known that high-performance microcellular elastomers can be prepared from straight-chain polyesters or polyethers from tetrahydrofuran. Such polyesters or polyethers contain primary hydroxyl end-groups. Microcellular elastomers of this type are usually prepared by the prepolymer technique wherein the polyester or polyether is first reacted with an excess of an organic diisocyanate and then reacted with water or other chain-extension agent. In case a chain extension agent other than water is utilized, a compound capable of being volatilized at low temperature or a blowing agent capable of releasing a gas at higher temperature is utilized. It has also been proposed to manufacture such microcellular elastomers by a one-shot technique wherein the polyester or polyether, the organic polyisocyanate, and the water or other chain-extension agent are reacted simultaneously.

Most of the microcellular urethane elastomers prepared by the one-shot or prepolymer techniques are either totally closed-cell foams or contain a high percentage of closed cells. For this reason, while it has been observed that it is easily possible to produce microcellular foams which retain their shape over a wide temperature range as long as they have a density range of at least about 20–25 lbs./cu. ft. and above, with foams of lower densities it has been observed that they show very severe shrinkage and are, therefore useless for most applications.

The density range of as low as 6 lbs./cu. ft. to as high as 20–25 lbs./cu. ft. is a very desirable range for a variety of industrial applications. By way of example, a low-density substantially shrinkage-free microcellular urethane elastomer is desirde in the manufacture of "bullet-proof" tires useful for a variety of military vehicles including amphibious vehicles, vehicles which must maneuver in difficult terrain, and the like. In the manufacture of such a bullet-proof tire, the microcellular elastomer must be of sufficiently low density to fill up the air-space which is normally present in a conventional tire, but the resulting tire must possess a load-deflection curve which is similar to that of a lightly inflated air tire in order to be capable of maneuvering properly over uneven terrain, sand, muck, swamp, etc. Consequently, in the manufacture of such tires, it is desirable to limit the density of the microcellular urethane core to about 6–15 lbs./cu. ft. in order to achieve the proper ride characteristics of such tires. Foaming of such structures without shrinkage has not been possible with conventional microcellular urethane elastomer formulations.

Very surprisingly, we have now found that microcellular urethane elastomers of excellent strength and low density can be made without observable shrinkage by employing polyesters or polyetetramethyleneoxy glycols which contain at least about 35% of their hydroxyl end-groups in the form of slower-reacting secondary hydroxyl end-groups. The slower-reacting secondary hydroxyl end-groups evidently create a foam system which has a better balance between formation of the polymer network and release of the gas, resulting a predominantly open-celled foam structure which is essentially devoid of the phenomenon of shrinkage.

SUMMARY OF THE INVENTION

It is accordingly one object of this invention to provide novel process for the production of essentially open-celled microcellular urethane elastomers in the density range of about 6 to about 25 lbs./cu. ft. and products resulting therefrom, which avoid or mitigate the disadvantage of the prior art.

It is a further object of the invention to provide a novel process for the manufacture of tires which have an air-space filled with predominantly open-celled microcellular urethane elastomer.

Another object of this invention is to provide novel processes for the production of microcellular urethane elastomers which are predominantly open-celled and have a density range of from 6 to about 25 lbs./cu. ft. and to provide novel polyurethane products therefrom.

A still further object of this invention is to provide novel processes for the manufacture of partially secondary hydroxyl end-blocked polytetramethyleneoxy glycols and polyesters from dicarboxylic acids, hydroxycarboxylic acids or lactones, and glycols, and to provide the novel polyol products resulting therefrom.

Further objects and advantages of the invention will become apparent as the description thereof proceeds.

In satisfaction of the foregoing objects and advantages there is provided a process for the production of predominantly open-celled microcellular polyurethane elastomers having a density range of from about 6 to about 25 lbs./cu. ft. and microcellular polyurethane elastomer products of this density range. This process comprises mixing a formulation comprising (a) a polyol containing at least about 35% of its hydroxyl end-groups in the form of secondary hydroxyl end-groups, (b) a polyisocyanate, (c) a catalyst, (d) a surfactant, and (e) a foaming agent comprising a blowing agent and a chain-extender selected from the group consisting of water, triols, and glycols, to form a homogeneous mixture, charging the mixture to a mold or other device at about 20 to about 80° C., permitting the foaming to occur, and recovering the microcellular elastomer thus produced.

Also provided by this invention are the foamed articles resulting from this process which comprise predominantly open-celled microcellular urethane tlastomer products having a density of from about 6 to about 25 lbs./cu. ft. Also provided by this invention are microcellular elastomer tires comprising an outer layer of rubber or solid polyurethane elastomer thread and an inner core of a predominantly open-celled microcellular urethane elastomer having a density range of from about 6 to about 25 lbs./cu. ft., as shown in the accompanying drawings.

The microcellular polyurethane elastomers of this invention are most conveniently foamed in place, as in a mold. A conventional tire, having a side wall 11 and tread 12 of thread and natural or synthetic rubber, may serve as the mold into which the freshly mixed polyurethane formulation is poured. The expanded polyurethane elastomer 12 bonds to the inner surface of the tire and forms a high-performance, integral unit.

Figure 1:
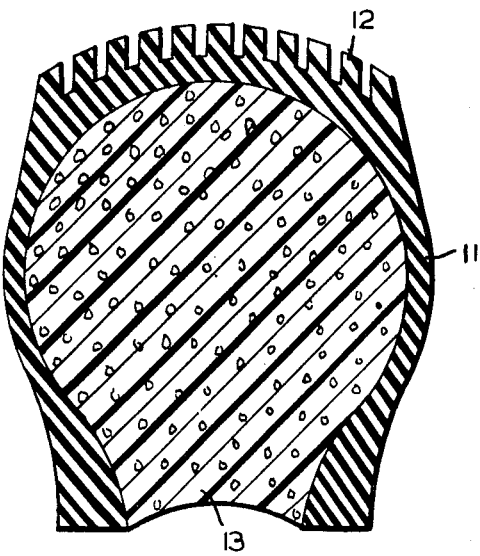
FIG. 1 is a cross-sectional view of a bullet-proof vehicle tire for amphibious vehicles having the predominantly open-celled microcellular polyurethane elastomers of this invention as the core section thereof.
Figure 2:
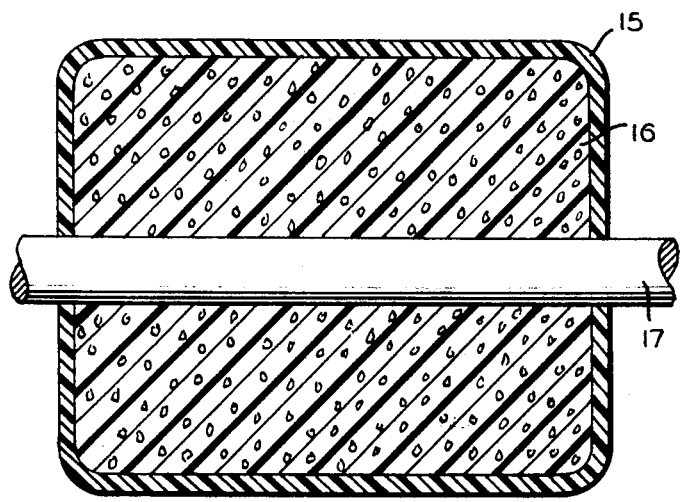
FIG. 2 is a cross-sectional view of a bullet-proof vehicle tire for amphibious vehicles having the predominantly open-celled microcellular polyurethane elastomers of this invention as the core sections thereof and the solid urethane elastomer coating of this invention as the periphery thereof.

As shown in FIG. 2, a tire without tread and side walls can be made by expanding the microcellular polyurethane elastomer formulation inside of a tire core mold, removing the finished microcellular polyurethane elastomer 16 from the mold, and spraying a solid urethane formulation onto the periphery thereof to form a tough surface coating 15. An axle 17 can be centrally positioned within the tire core mold before adding the elastomeric formulation thereto, if desired.

DESCRIPTION OF PREFERRED EMBODIMENTS

The novel process of this invention is based on the unexpected finding that predominantly open-celled microcellular urethane elastomers in the density range of from about 6 to about 25 lbs./cu. ft. may be produced by utilizing in a foam formulation one or more polyols which contain at least about 35% of the terminal hydroxyl end-groups in the form of secondary hydroxyl end-groups.

According to this invention, it has been found that polyols containing exclusively primary hydroxyl end-groups will react much faster with organic polyisocyanates than those containing a substantial portion, for example at least about 35%, of secondary hydroxyl end-groups. During the manufacture of a microcellular elastomer, the two main reactions which take place are the formation of the polymer network by reaction of polyol, polyisocyanate, and water and the simultaneous gas-forming reaction of water and isocyanate which produces carbon dioxide. If the polymer-forming reaction is very fast in relation to the gas-forming reaction, a predominantly closed-cell microcellular elastomer will result because the polymer network has sufficient strength during the last stages of the foaming process to contain a major portion of the carbon dioxide gas. The resulting microcellular elastomers are therefore predominantly closed-cell products.

At a density range above about 20–25 lbs./cu. ft., an essentially closed-cell microcellular urethane elastomer has enough physical integrity to withstand the momentary pressure differential brought about by the more rapid escape of carbon dioxide in relationship to the surrounding air which enters the structure in due course.

Below a density range of about 20–25 lbs./cu. ft., a predominantly closed-cell microcellular urethane elastomer will exhibit severe shrinkage because the carbon dioxide within the individual cells escapes at an appreciably faster rate into the atmosphere than the surrounding air can enter the individual cells. Consequently, the resulting decrease in gas pressure within an individual cell brings about a total or partial collapse of this cell with the resulting observation that closed-cell microcellular urethane elastomers having a density of less than about 20–25 lbs./cu. ft. will shrink severely within a few hours or sometimes a few days after they have been molded. In the density range below about 20–25 lbs./cu. ft., the microcellular elastomer must be, to a relatively large extent, open-celled in order to allow almost instantaneous replacement of the escaping carbon dioxide with air to prevent the occurrence of the afore-mentioned pressure differential within a foam cell and the surrounding atmosphere.

According to this invention, it has been found that by proper adjustment of the relative rate of the polymer network-forming reaction and of the gas-blowing reaction, a sufficiently open-celled microcellular urethane elastomer in the density range of about 6 to about 25 lbs./cu. ft. may be prepared to avoid the occurrence of shrinkage of the resulting product. By slowing down of the polymer-forming reaction in relation to the gas-forming reaction there exists a greater probability of breakage of the individual cell walls before the top of the rise of the microcellular elastomer is reached. This breakage of cell-walls results in a partially or predominantly open-celled structure, the formation of open cells being dependent upon many variables which affect the stability of the polymer network, for example, rate of isocyanate-hydroxyl reaction and rate of gas-forming reaction, stabilization of the individual cells by means of surfactants, catalyst concentration, and other variables.

Surprisingly, it has now been discovered that the above relationships can be altered sufficiently to bring about the formation of predominantly open-celled microcellular urethane elastomers exhibiting essentially no shrinkage in the density range of from about 6 lbs. to about 25 lbs./cu. ft. by employing polyol intermediates which contain at least about 35% of their terminal hydroxyl groups in the form of secondary hydroxyl end-groups.

The prior art polyols which have heretofore been utilized in the manufacture of microcellular elastomer contain essentially primary hydroxyl end-groups. Typical products of this type are polyether glycols, such as the polytetramethyleneoxy glycols derived from tetrahydrofuran by polymerizing with such catalysts as oxonium salts of hydrogen halides, as described in U.S. 3,169,945, column 3, lines 26–39, and the polyester glycols derived from dicarboxylic acids, hydroxycarboxylic acids or lactone, and glycols. Products of this type contain primary hydroxyl end-groups.

Polyoxypropylene glycols which contain essentially secondary hydroxyl end-groups have found little use in the manufacture of mircocellular urethane elastomers since the resulting products do not exhibit the outstanding mechanical and dynamic performance characteristics of the materials derived from the tetrahydrofuran polyether glycols or the polyester glycols. Consequently, the present invention is concerned with partially secondary hydroxyl-terminated polyols from polyether glycols derived from tetrahydrofuran and from polyester glycols of dicarboxylic acids, hydroxy acids or lactones and glycols.

The conversion of the primary hydroxyl-terminated polyether glycols and polyester glycols of the prior art to partially secondary hydroxyl-terminated products may be brought about, among other methods, by the following techniques:

(1) Adding a substituted 1,2-alkylene oxide or a substituted 1,2-cyclic carbonate to a primary hydroxyl-terminated polyether glycol or to a primary hydroxyl-terminated polyester;

(2) Adding a substituted 1,2-alkylene oxide or a substituted 1,2-cyclic carbonate to a carboxyl-terminated polyester; and (3) Reacting a primary hydroxyl-terminated polyether or polyester glycol with an excess of a substituted organic diisocyanate to form an isocyanate end-blocked product which is reacted with a substituted disecondary or monosecondary glycol.

In these reactions, the substituents in the alkylene oxides, cyclic carbonates and organic diisocyanates may be alkylene, arylene, aralkylene, cycloalkylene, and the like. The substituents in the disecondary and monosecondary glycols are alkylene, cycloalkylene, arylene, and the like.

The polyether glycol starting materials from tetrahydrofuran which contain primary hydroxyl end-groups are well known in the art and may possess molecular weights of from about 500 to about 3000, preferably from about 750 to about 2500.

The polyester glycol starting materials are also well known in the art and their molecular weight ranges are essentially identical with the ranges shown for polyether glycols. The polyester glycols, which may contain a slight degree of branching by virtue of addition of a small quantity of a triol or tetrol during their preparation, are synthesized from dicarboxylic acids such as, for example, glutaric acid, glutaric anhydride, adipic acid, pimelic acid, azelaic acid, sebacic acid, 6-hydroxycaproic acid or ε-caprolactone and the like, by reacting with the required amount of glycols such as, for example, ethylene glycol, 1,4-butanediol, neopentylene glycol, 1,6-hexanediol, diethylene glycol, and the like.

It is also within the scope of this invention to prepare a polyester having at least in part secondary hydroxyl end-groups by replacing at least a portion of the diprimary glycols utilized in the formation of the polyester with mono- or di-secondary glycols such as propylene glycol, dipropylene glycol, 1,3-butanediol, and the like.

The alkylene oxides and cyclic carbonates which are particularly suitable for the modification of the above polymer glycols are by way of example, propylene oxide and propylene carbonate, 1,2-butylene oxide and its cyclic carbonate, and the like.

The isocyanates and disecondary or monosecondary glycols which are particularly useful for conducting the above reactions are by way of example, hexamethylene diisocyanate, 2,4-toluene diisocyanate, 2,6-toluene diisocyanate and mixtures of the two toluene diisocyanates, and the like, propylene glycol, dipropylene glycol, 1,3-butylene glycol, 2-ethyl-hexane-1,3-diol, and the like.

The addition of the 1,2-alkylene oxide or the corresponding carbonate to the polyether or polyester glycol is carried out at a temperature of from about 70° C. to about 250° C., preferably at about 100–200° C. It is highly preferable to utilize a catalyst for this addition reaction. Suitable catalysts include, among others, bases such as NaOH, KOH, quaternary ammonium hydroxides and the like, or Lewis acids such as $BF_3$, $SbCl_5$, $PF_5$, $CH_3COCl \cdot BF_3$, and the like. After completion of the alkylene oxide addition, the materials are refined by ion-exchange or other means to remove the catalyst impurities which would interfere with the subsequent isocyanate reactions.

The addition of alkylene oxides or the corresponding cyclic carbonates to the carboxyl-terminated polyesters is carried out at a temperature of about 100° C. to about 250° C., preferably at 120–180° C., particularly in case of the 1,2-alkylene oxides. A catalyst need not be present for this reaction since the carboxyl group is capable of accelerating the reaction, although catalysts may be employed if desired.

The reaction of the polyether or polyester glycol with the diisocyanate is performed at a temperature of from 25° C. to about 200° C., preferably at about 60 to 100° C. The ratio of diisocyanate to polyether or polyester glycol is preferably about 1:1 although departures from this ratio are permissible. The reaction conditions and the preferred reactant ratios of the isocyanate-terminated products with the monosecondary or disecondary glycols to produce the partially or predominantly secondary hydroxyl-terminated glycols are essentially identical to those of the first step of this reaction sequence. If desired, these reactions may be catalyzed by means of tertiary amines, metallic catalysts, and the like.

The most preferred polyisocyanates which are particularly useful for the manufacture of the microcellular urethane elastomers of the present invention include symmetrical diisocyanates such as diphenylmethane diisocyanate, 4,4'-biphenylene diisocyanate, 1,5-naphthalene diisocyanate, 3,3'-dimethyl-4,4'-biphenylene diisocyanate, 3,3'-dimethyloxy-4,4'-biphenylene diisocyanate, and the like. A derivative which is also highly desirable consists of the liquid carbodiimide derived from diphenylmethane diisocyanate or, still more preferable, an admixture of such carbodiimide derivatives with diphenylmethane diisocyanate. A product of this last type which is commercially available is "Isonate" 143L sold by the Upjohn Company.

Chain-extension agents which are utilized in the manufacture of the microcellular urethane elastomers of the present invention include, by the way of example, water, glycols such as diethylene glycol, 1,4-butanediol, and 1,6-hexanediol, triols such as 1,2,6-hexanetriol, trimethylolpropane, and the like. Water serves the dual purpose of chain-extender and blowing agent since it produces carbon dioxide upon reaction with an isocyanate. It is also within the scope of the present invention to utilize mixtures of the above chain-extension agents or to utilize chain-extension agents other than water in combination with another blowing agent, or a combination of the two methods.

Other blowing agents which are useful include low-boiling organic compounds such as fluorocarbons, chlorocarbons, hydrocarbons, and the like. Alternately, compounds which are capable of releasing nitrogen can be utilized.

Surfactants which can be utilized in the present process include alkylene oxide adducts of phenols, vegetable oils and the like, sulfonated fatty acid salts, for example, the sodium salt of sulfonated castor oil, polyoxyalkylene-polydimethylsiloxane copolymer surfactants, and the like. All these surfactants are well known in the art. It is also feasible to prepare the products of the invention in the absence of a surfactant system, particularly in the higher density range of 20–25 lbs./cu. ft., as described in the present invention.

The catalyst materials employed in the formation of the microcellular elastomers of the present invention include tertiary amine catalysts and metallic catalysts, all well known in the art. A particularly useful combination consists of a mixture of one or more tertiary amine catalysts in admixture with tin, lead or mercury compounds. Suitable tertiary amine catalysts are N,N,N',N'-tetramethyl-1,3-butanediamine, N-alkyl morpholines, triethylenediamine, N-alkyl piperazines as well as other known amines. Useful metallic catalysts are lead octoate and other lead compounds such as lead borate, stannous acylates, dialkyltin diacylates and many other tin compounds, tetraalkyl titanates, as well as other metallic catalysts which are known in the polyurethane art.

The amount of secondary hydroxyl termination of the polyether or polyester glycol should be at least about 35% of the total terminal hydroxyl groups present. For example, it has been observed that during the addition of 2 mols of propylene oxide to one mol of polyether glycol possessing all primary hydroxyl end-group, the resulting adduct contained 35–40% of secondary hydroxyl end-groups. This product was suitable in the process of the present invention. It is, of course, also within the scope of this invention to utilize polyether or polyester glycols which contain considerably larger amounts and even approach about 100% of secondary terminal hydroxyl end-groups, although in most cases, a range of from about 35% to about 70% of secondary hydroxyl termination is easier to achieve.

The amount of partially or predominantly secondary hydroxyl-terminated polyether or polyester glycol, the amount of organic polyisocyanate, and the amount of water or other chain-extension agent, or other blowing agent utilized depends upon the desired density and other characteristics of the resulting product. The preferred ratio of NCO equivalents to hydroxyl and water equivalents utilized in the manufacture of the microcellular elastomers of the present invention is from about 0.95 to about 1.15, although departures to either side of this ratio are within the scope of this invention.

The microcellular elastomers of the present invention are preferably produced by the so-called one-shot technique, whereby the polyester or polyether glycol, the diisocyanate, and the water or other chain-extender are reacted simultaneously in the presence of the catalyst and surfactant. This is accomplished by admixing at least two separate materials, one material for example consisting of a mix of the polyether or polyester polyol, chain-extender or water, catalyst, and surfactant, and the other material consisting of the diisocyanate. More than two materials can be mixed simultaneously, of course, by the use of a sutiable foam-dispensing machine. It is further within the scope of the present invention to prepare a partial or quasi-prepolymer with a portion of the polyether or polyester glycol and the diisocyanate to prepare a quasi-prepolymer which contains free isocyanate groups. This material can be utilized in place of the diisocyanate.

It is further highly preferable to utilize symmetrical diisocyanates or mixtures of such diisocyanates which possess a relatively low melting point. Therefore, diphenylmethane diisocyanate or mixtures thereof with the other diisocyanates in ratios which result in a low melting point are highly preferred, since the subsequent foaming reaction is most conveniently conducted at relatively low temperature, for example at from 25° C. to about 60° C.

In the manufacture of "bullet-proof" tires containing an open-celled microcellular polyurethane elastomer with a density range of from about 6 to about 15 lbs./cu. ft. as core material, a tire can be manufactured first by foaming a formulation in a suitable mold to form the microcellular core, which may be directly foamed around the tire axle if desired. Thereafter, the solid urethane elastomer is applied directly onto the outer periphery of the microcellular core by spraying onto its surface one or more layers of a solid-type spray urethane elastomer which may be of the 100% solids type or may contain a suitable solvent. Typical systems containing halogenated hydrocarbon solvents and the like consist of Adiprene L-100 or L-167 prepolymers (E. I. du Pont de Nemours & Co.) which are chain-extended by means of 4,4'-diphenylmethane diamine and the like. Adiprene L-100 or L-167 are prepolymers of polytetramethyleneoxy glycols and toluene diisocyanates. The 100% solid urethane elastomer spray systems consist of prepolymers of 4,4'-diphenylmethane diisocyanate with hydroxy-terminated polyesters which are chain-extended with glycols such as 1,4-butanediol and the like in the presence of potent isocyanate catalysts such as, for example, stannous acylates, dialkyltin diacylates, phenyl mercuric acylates, and the like. The above solid urethane elastomer coating may be applied in thicknesses of 1/16 inch or less to about 1/4 inch or more, depending upon the coatings technique utilized. The 100% solids coating generally lends itself better to the application of the thicker coatings.

An alternate method for the manufacture of "bullet-proof" tires consists of the formation of the open-cell microcellular urethane elastomer core inside the already pre-formed outer tire by means of foaming such microcellular foam ingredients in a suitable mold designed to hold both the tire carcass and the core and to seal off the core portion of the tire. The outer tire may be constructed in the conventional fashion by utilizing the tire construction techniques well known in the art. The rubber utilized for such construction may be natural or synthetic or mixtures thereof.

The construction of tires, whether they comprise a solid urethane casing or a conventional rubber casing, requires the use of a microcellular urethane elastomer foam core having a density of from about 6 to as high as 15 lbs./cu. ft. to obtain the desired load deflection characteristics necessary to support adequate loadings under use conditions. Within this range, core densities of from 6–10 lbs./ cu. ft. are still more preferable since they result in higher deflection at a given load which results not only in a softer ride for the vehicle, but also allows the deflected tire to conform much better to the obstacles and obstructions over which it is required to roll. At the above, relatively low core densities for the microcellular urethane elastomers it becomes very important to insure essentially shrinkage-free manufacture of these core parts. Therefore, the process of the present invention is admirably suitable for the manufacture of low-pressure tires as utilized in amphibian military and civilian vehicles.

The invention is further illustrated by the following examples:

EXAMPLE 1

This example describes the formation of microcellular urethane elastomers of relatively low density utilizing commercially available polyether and polyester glycols having primary terminal hydroxyl end-groups.

Microcellular elastomer A

A recipe is premixed, comprising 91 gm. of "Polymeg" 1000 (a primary hydroxyl-terminated polytetramethyleneoxy glycol having a molecular weight of about 1020, available from Quaker Oats Company), 9 gm. of anhydrous 1,4-butanediol, 0.5 gm. of water, 0.4 gm. of N,N,N',N'-tetramethyl-1,3-butanediamine, and 0.05 gm. of T52 N concentrate (a dibutyltin diacylate catalyst available from Carlisle Chemical Works), all premixed in a waxed paper cup by means of an electric stirrer. A total of 63.6 gm. of Isonate 143–L (diphenylmethane diisocyanate containing carbodiimide, 29.2% NCO content, available from the Upjohn Company) is added to the above mix while agitating rapidly by means of the electric stirrer. As soon as the mixture begins to foam, it is quickly transferred into a waxed paper cup and the elastomer is allowed to expand. Upon standing at room temperature the foam soon begins to pull away from the paper cup and shrinks severely. Closer examination of the product indicates the presence of a very high closed-cell content.

Microcellular elastomer B

A recipe is premixed comprising 91 gm. of "Desmophen" 2001 (a primary hydroxyl-terminated linear polyester from adipic acid, ethylene glycol and 1,4-butanediol available from Farbenfabriken Bayer), 9 gm. of anhydrous 1,4-butanediol, 0.2 gm. 1,2,6-hexanetriol, 0.15 gm. of water, 0.3 gm. of 1,1,3,3-tetramethyl guanidine, and 0.3 gm. of a 24% solution of lead octoate as described above. A total of 45.7 gm. of Isonate 143–L diisocyanate is mixed with the above and allowed to foam. The resulting foam has a density of 20 lbs./cu. ft. and exhibits shrinkage at the bottom of the paper cup. Closer examination reveals the presence of high closed-cell content.

Microcellular elastomer C

A recipe is premixed comprising 95 gm. of Polymeg 1000 (M.W.=1010), 5 gm. of anhydrous 1,4-butanediol, 0.5 gm. of water, and 1.2 gm. of "Dabco" 33 LV (catalyst mixture containing about 0.4 gm. of triethylenediamine available from Houdry Process Corporation). A total of 53.5 gm. of Isonate 143–L diisocyanate is mixed with the above and the ingredients are allowed to foam after transfer to a 1-quart Lily cup. After 45 minutes, the foam has pulled away from the cup and exhibits severe shrinkage. Examination of the product indicates the presence of a high closed-cell content.

EXAMPLE 2

The following experiments describe the formation of a substantially open-cell microcellular elastomer which exhibits no shrinkage by utilizing polytetramethyleneoxy glycols containing in part secondary hydroxyl end-groups.

To a reaction flask equipped with dropping funnel, agitator, thermometer, and acetone-Dry Ice condenser there is charged 3570 gm. (3.5 mols) of Polymeg 1000 (mol. weight=1020) and 12.6 gm. of potassium hydroxide pellets. The charge is heated to 100° C. During this time the potassium hydroxide pellets dissolve. A total of 630 gm. (10.85 mols) of propylene oxide is added dropwise between 100 to 145° C. at such a rate as to have minimal or no reflux in the condenser. After completion of the reaction, the reactants are cooled to 50° C. and diluted with an equal volume of a 90:10 methanol:water mixture. The resulting mixture is percolated over two ion-exchange columns containing sulfonic acid resin Amberlite IR–120 H and the weakly basic resin Amberlite IR–45 in its hydroxyl form. The resulting column effluent has a pH of 5.5–6.0 indicating that catalyst impurities have been removed.

The column effluent is stripped to remove methanol and water and the polyether glycol is subjected to a vacuum of 1 mm. Hg at 150° C. to remove any remaining volatiles. The resulting polyether product has a hydroxyl number of 97.8 and an acid number of 0.18. This product, designated as polyether glycol A, contains a relatively high content of secondary hydroxyl end-groups as ascertained by NMR studies.

A recipe is premixed comprising 91 gm. of the above polyether glycol A, 9 gm. of 1,4-butanediol, 0.5 gm. of water, 0.4 gm. of N,N,N',N'-tetramethyl-1,3-butanediamine, and 0.05 gm. of T52 N concentrate tin catalyst. A total of 62.5 gm. of Isonate 143–L diisocyanate is mixed with the above ingredients and the foaming mixture is transferred to a waxed cup. The resulting microcellular urethane elastomer exhibits no shrinkage, is of very high strength, and has a density of 12.1 lbs./cu. ft. Closer examination of the foam reveals that it contains a high percentage of open cells. Utilization of polyether glycol A which contains both secondary and primary hydroxyl end-groups results in an open-cell shrinkage-free microcellular elastomer, whereas the identical recipe utilizing Polymeg 1000 which contains only primary hydroxyl end-groups resulted in a closed-cell microcellular elastomer which exhibited severe shrinkage microcellular elastomer A of Example 1).

Another recipe is premixed comprising 890 gm. of polyether glycol A, 50 grams of 1,4-butanediol, 60 grams of methylene-bis-(o-chloroaniline) ("Moca," E. I. du Pont de Nemours & Co.), 0.4 gm. of adipic acid, 2.0 gm. of water, 6.0 gm. of a 24% solution of lead octoate, 1.0 gm. of T52 N concentrate tin catalyst, 0.2 gm. of Ionol antioxidant (ditert. butyl p-cresol), and 3.0 gm. of N,N,N',N'-tetramethyl - 1,3 - butanediamine. Thereafter, a total of 460 gm. of Isonate 143–L diisocyanate is admixed to the above premix and the resulting foaming mixture is transfrered to a metal mold having dimensions of 12 x 12 x 1 inch, said mold being pretreated with a suitable mold release agent. The resulting foam is cured for 20 minutes at 122° C., is demolded and is further cured for 22 hours at 70° C. The micrcocellular elastomer product has a density of 19 lbs./cu. ft., and exhibits no shrinkage in this relatively critical molding test. The product has high strength and low compression set.

Another polyether glycol (polyether glycol B) is prepared by reacting 2000 gm. (approx. 2 mols) of Polymeg 1000 with 232 gm. (4 mols) of propylene oxide in the presence of 6.7 gm. of KOH at 100–125° C. The material is refined as above by means of the ion exchange treatment. The stripped polyether glycol B has a hydroxyl number of 100.5 and an acid number of 1.1.

A microcellular elastomer is prepared in the usual manner by admixing 95 gm. of polyether glycol B, 5 gm. of 1,4-butanediol, 0.5 gm. of water, 1.2 gm. of "Dabco" 33 LV catalyst, and 50.3 gm. of Isonate 143–L diisocyanate. The resulting microcellular elastomer has excellent strength, exhibits no shrinkage, contains a high percentage of open cells, and has a density of 10.8 lbs./ cu. ft.

In contrast thereto, microcellular elastomer C of Example 1, which exhibits severe shrinkage, was prepared with the identical recipe except that Polymeg 1000 which contains primary hydroxyl end-groups was substituted for polyether glycol B which contains both secondary and primary hydroxyl end-groups.

EXAMPLE 3

This example describes the preparation of a polyester product, which contains both primary and secondary hydroxyl end-groups, as well as its conversion to an open-cell microcellular urethane elastomer.

A polyester intermediate is prepared by reacting 939 gm. of dipropylene glycol, 3192 gm. of ε-caprolactone, and 20 parts per million based on the above reactants of stannous octoate catalyst for 13 hours at 180° C. The resulting polyester intermediate which contains secondary and primary hydroxyl end-groups has a hydroxyl number of 185.1 and a carboxyl number of 1.3.

A total of 1770 gm. of this polyester intermediate is reacted with 292 gm. of adipic acid in the presence of 25 parts per million based on the above ingredients of tetraisopropyl titanate catalyst. The resulting water is removed by azeotropic distillation with xylene. The final pot temperature is 250° C. and the reaction is terminated after the acid number reaches a value of less than 0.5. The resulting polyester product which contains secondary and primary hydroxyl end-groups has a hydroxyl number of 44.7 and an acid number of 0.3.

A microcellular elastomer is prepared by mixing in the usual manner a recipe comprising 90 gm. of the polyester (OH-No.=44.7), 10.0 gm. of 1,4-butanediol, 0.2 gm. of 1,2,6-hexanetriol, 0.15 gm. of water, 0.3 gm. of 1,1,3,3-tetramethyl guanidine, 0.35 gm. of a 24% solution of lead octoate and 46.85 gm. of Isonate 143–L diisocyanate. The resulting microcellular elastomer exhibits high resiliency, high tear and tensile strength and has a density of 20 lbs./cu. ft. It shows no shrinkage and upon closer examination is shown to contain a high percentage of open cells.

In contrast thereto, microcellular elastomer B of Example 1, which was prepared by a very similar recipe except that Desmophen 2001 polyester containing solely primary hydroxyl end-groups was utilized in place of the above polyester, exhibited shrinkage. Consequently, the present example demonstrates the use of a partially secondary hydroxyl-terminated polyester for the manufacture of microcellular elastomers which are devoid of shrinkage.

EXAMPLE 4

The present example illustrates still another technique of introducing secondary hydroxyl end-groups into a polyester or polyether glycol molecular and its beneficial effect upon the manufacture of shrinkage-free microcellular elastomers.

A copolyesterdiol which contains, by weight, 60% of the ε-oxycaproyl unit (derived from ε-caprolactane) and 40% of the residues obtained by employing adipic acid and an equimolar mixture of ethylene glycol and 1,4-butanediol in the theoretically required proportions, having primary terminal hydroxyl groups, a hydroxyl number of 60.7 and a carboxyl number of 0.3, is utilized as the starting material.

A 500 gm. portion of the above copolyesterdiol is mixed with 93.5 gm. of an 80:20 mixture of 2,4- and 2,6-toluene diisocyanate and heated for 3 hours at a temperature of 70–80° C. The resulting isocyanate terminated polymer is cooled to 25–30° C. and admixed with 38 gm. of propylene glycol. The reactants are further heated at 70–80° C. for a period of 3 hours during which time the polymer is converted to a secondary and primary hydroxyl group-terminated product. Upon analysis with phthalic anhydride in pyridine, the product exhibits a hydroxyl number of 45.30. It is a viscous liquid at room temperature.

A microcellular elastomer is prepared from the above copolyester-urethane diol (OH-No.=45.3) by admixing 100 gm. of said product, 1.5 gm. of water, 1.2 gm. of "Dabco" LV 33 catalyst, 0.1 gm. of L–531 polysiloxane-polyoxyalkylene copolymer (Union Carbide Corporation) surfactant, and 37.5 gm. of Isonate 143–L diisocyanate and foaming the ingredients in the usual manner. After curing the above microcellular elastomer for 20 minutes at 120° C. and allowing it to cool to room temperature, no shrinkage is observed. The microcellular elastomer has a core density of 11.5 lbs./cu. ft. and upon further examination is found to be predominantly open-celled.

A second microcellular elastomer is prepared from the above copolyester-urethanediol by admixing 95 gm. of said diol, 5 gm. of 1,4-butanediol, 1.0 gm. of water, 1.2 gm. of "Dabco" LV 33 catalyst, and 45.5 gm. of Isonate 143–L diisocyanate. After cure as above, the resulting product exhibits no shrinkage, is predominantly open-celled and upon measurements is found to have a core-density of 6.3 lbs./cu. ft.

EXAMPLE 5

This example illustrates the manufacture of a tire suitable for use with amphibious vehicles designated to operate under marginal terrain conditions.

A premix comprising the following ingredients is prepared:

(a) 4750 gm. of a polyether glycol, essentially equivalent to polyether glycol A described in Example 2, and having a hydroxyl number of 96.5 and an acid number of 0.1;
(b) 250 gm. of 1,4-butanediol;
(c) 30 gm. of water;
(d) 50 gm. of "Dabco" LV 33 catalyst;
(e) 1.5 gm. of L–530 surfactant (a polysiloxanepolyoxyalkylene copolymer surfactant available from Union Carbide Corporation).

The above premix is charged to the resin tank of a two-component foam machine designed for the mixing of polyol and isocyanate components. To the isocyanate tank of this machine is charged the liquid Isonate 143–L diisocyanate. The resin premix and the isocyanate are at a temperature of 23–25° C.

A total of 3658 gm. of the above premix and 1812 gm. of Isonate 143–L are metered simultaneously to the mixing head of the foam machine; said mixing head contains a suitable agitator rotating at 5000 r.p.m.

The discharge part of the mixing head is vented to a tire core mold containing the axle of the tire, which is centrally positioned therewithin, said axle having been pretreated with a urethane adhesive, the core section of the mold having a cavity of 1.27 cu. ft. Prior to the discharge of the foaming mix into the mold cavity, the mold is preheated to a temperature of 70° C. After discharge of the foaming mix into the mold, the mold is closed and heated at 100° C. for a period of 2 hours. The mold is allowed to cool to room temperature, and the axle and core section of the tire are removed from the mold (application of mold release agent prior to foaming is required). The core section of the tire exhibits no shrinkage. The overall density of the microcellular urethane elastomer core is measured to be about 9.5 lbs./cu. ft.

The above tire core section is allowed to cure further at room temperature for a period of 2 weeks, during which time there is a noticeable increase in the strength of the product.

The core section is now rotated slowly around its axle and a 100% solids urethane elastomer coating is applied by means of an airless spray gun (Binks Machine Co.) until the coating reaches a thickness of about ⅜ inch. The coatings composition consists of a diisocyanate prepolymer of polyethylene adipate (mol. weight=2,000, OH-No.=56) comprising 100 parts of the polyester and 40 parts of diphenylmethane diisocyanate. To 140 parts of this prepolymer which is pumped to the spray gun at 100° C., there is concurrently fed a mixture consisting of 9 parts of 1,4-butanediol and 1.5 parts of dibutyltin dilaurate and 0.1 part of "Dabco" 33 LV. After about 1 week at room temperature, the resulting elastomer reaches its ultimate properties.

The resulting tire, which is essentially "bullet-proof" by means of the construction, exhibits a suitable compromise of load versus deflection, since it must be designed to replace a low-pressure air-filled tire. In order to obtain the desired deflection characteristics, the density of the microcellular urethane must be kept below 15 lbs./cu. ft., preferably even below 10 lbs./cu. ft. In this density range, formation of open-celled microcellular urethane elastomers becomes imperative to avoid shrinkage and thus to make possible the construction of the above tire.

While the invention has been described in detail with reference to certain specific embodiments thereof, various changes and modifications which fall within the sphere of the invention and scope of the appended claims will become apparent to the skilled urethane chemist. The invention is intended, therefore, to be limited only by the appended claims or their equivalent.

What is claimed is:

1. A bullet-proof vehicle tire for amphibious vehicles, having as the core thereof predominately open-celled microcellular polyurethane foamed elastomers having a density of from about 6 to about 25 pounds per cubic foot produced by the reaction of (a) a polyol containing at least 35% of secondary hydroxyl end-groups, (b) an organic polyisocyanate, (c) a surfactant, (d) a foaming agent, and (e) a catalyst; and an outer peripheral coating.

2. The tire of clim 1 wherein the polyol is a polyether glycol which is end-blocked by means of secondary hydroxyl groups to the extent of at least 35% by reacting with a member selected from the group consisting of substituted 1,2-alkylene oxides and substituted 1,2-cyclic carbonates.

3. The tire of claim 2 wherein said polyether glycol is a polytetramethyleneoxy glycol which is derived from tetrahydrofuran by catalytic polymerization with oxonium salts of hydrogen halides.

4. The tire of claim 1 wherein said core is bonded to the axle of said vehicle.

5. The tire of claim 1 wherein said peripheral coating is a 100%-solids urethane elastomer coating which consists of 140 parts of a diisocyanate prepolymer of polyethylene adipate, having a molecular weight of about 2000 and a hydroxyl number of about 56, 9 parts of 1,4-butanediol, 1.5 parts of dibutyltin dilaurate, and 0.1 part of a catalyst mixture containing about one-third triethylenediamine.

6. The bullet-proof vehicle tire of claim 1 wherein said core consists of a predominantly open-celled microcellular polyurethane elastomer having a density below 15 lbs. per cu. ft.

References Cited
UNITED STATES PATENTS

| | | | |
|---|---|---|---|
| 1,707,815 | 4/1929 | Robb | 152—323 |
| 2,729,618 | 1/1956 | Muller et al. | 260—75 |
| 2,902,072 | 9/1959 | Reuter | 152—330 |
| 3,022,810 | 2/1962 | Lambe | 152—157 |
| 3,348,597 | 10/1967 | Goldberg et al. | 152—323 |
| 3,396,773 | 8/1968 | Alderfer | 152—313 |

FOREIGN PATENTS

| | | | |
|---|---|---|---|
| 1,438,004 | 3/1966 | France | 260—2.5 |

ARTHUR L. LA POINT, Primary Examiner

U.S. Cl. X.R.

152—313; 260—2.5